UNITED STATES PATENT OFFICE.

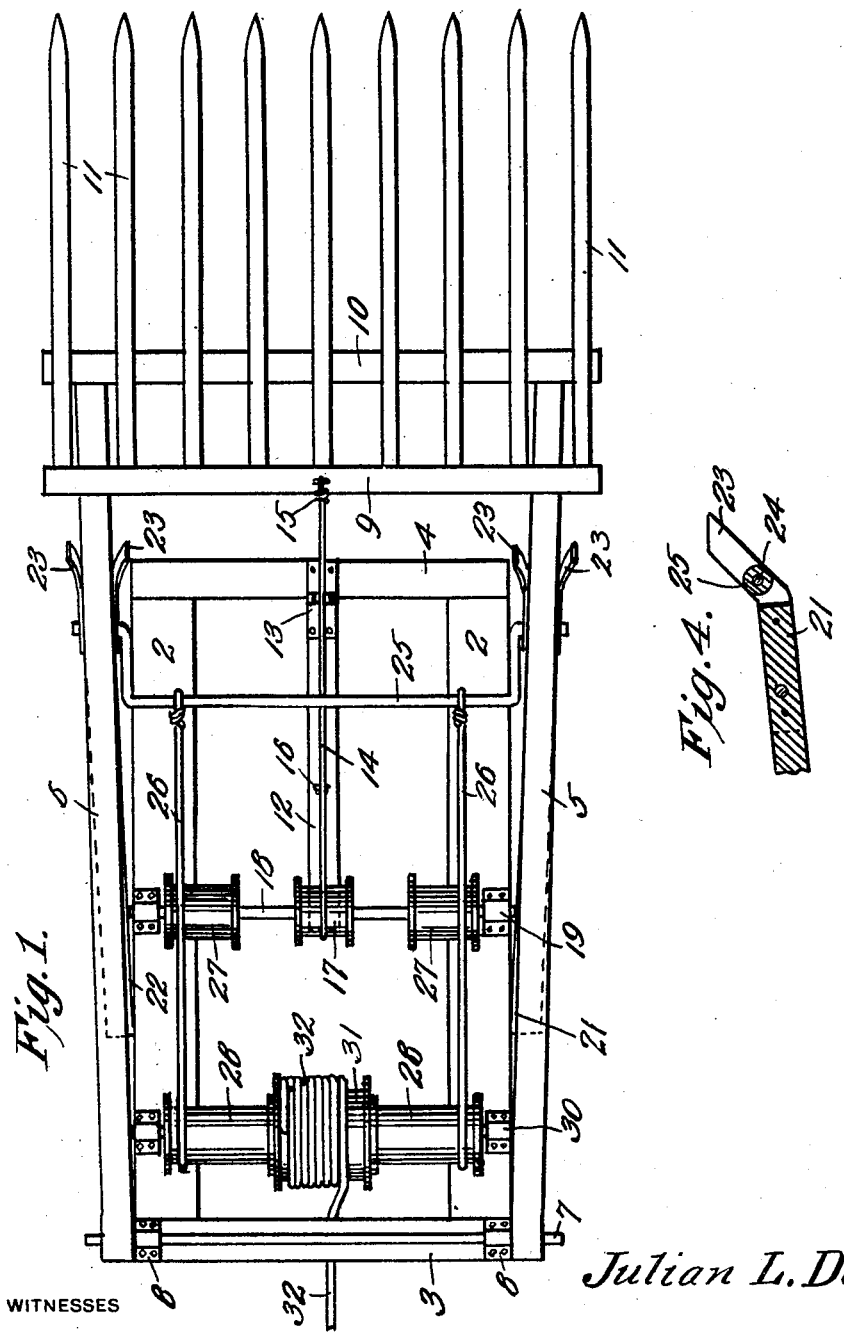

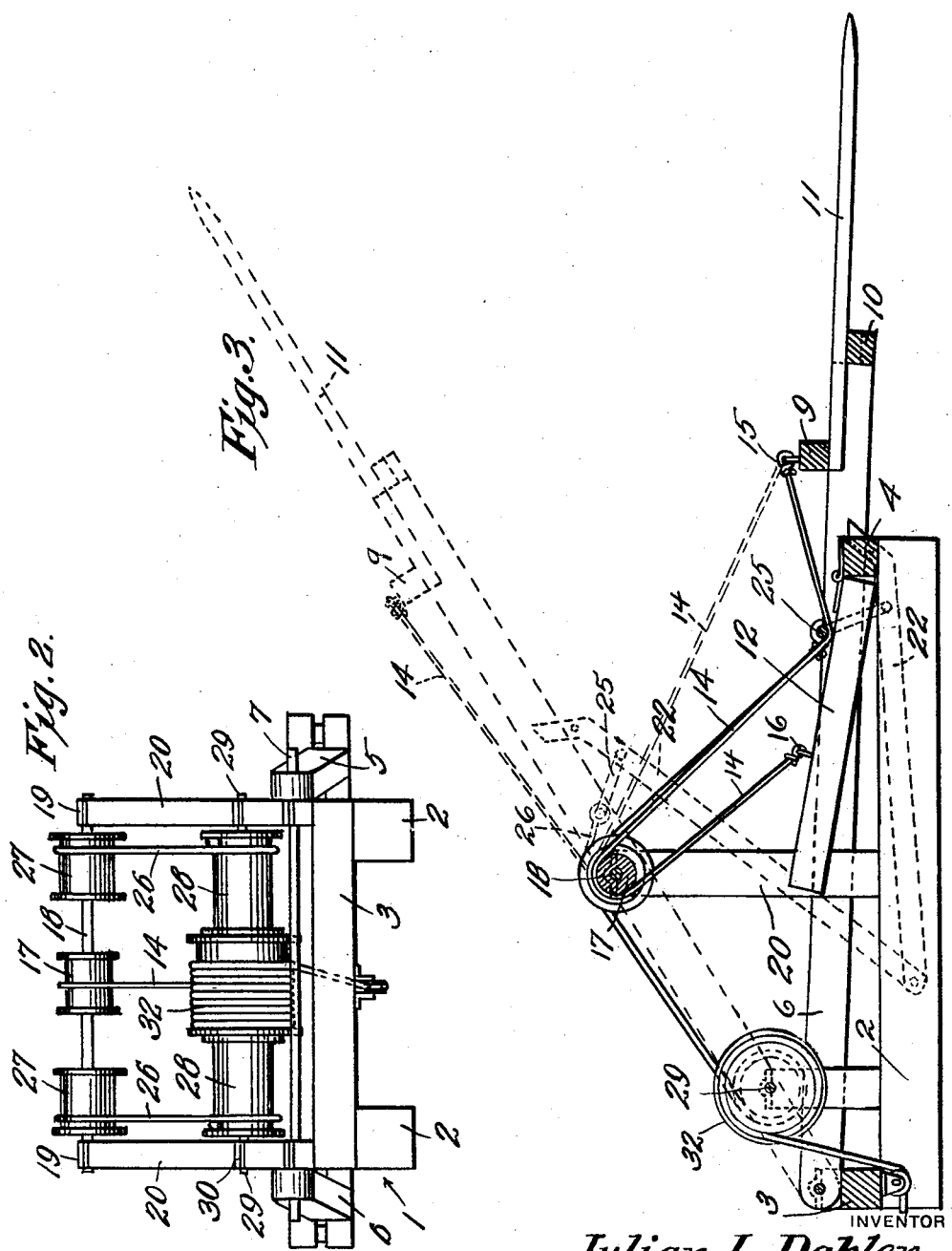

JULIAN L. DAHLEN, OF BORUP, MINNESOTA.

HAY-STACKER.

1,324,799.  Specification of Letters Patent.  Patented Dec. 16, 1919.

Application filed May 28, 1918. Serial No. 237,069.

*To all whom it may concern:*

Be it known that I, JULIAN L. DAHLEN, a citizen of the United States, residing at Borup, in the county of Norman and State of Minnesota, have invented certain new and useful Improvements in Hay-Stackers, of which the following is a specification.

This invention relates to hay stackers, and the object thereof is to provide a simple, strong and efficient apparatus of this character so constructed that the fork or rake may be easily raised and automatically lowered.

Another object is to provide simple and efficient means for carrying the fork past its dead center on the release thereof by the raising means thereby starting it on its return movement.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a hay stacker constructed in accordance with this invention, Fig. 2 is a rear elevation thereof, Fig. 3 is a longitudinal section with the lifting fork shown in lowered position in full lines and in partially raised position in dotted lines, and Fig. 4 is a detail longitudinal section through one of the fork supporting and bracing members.

In the embodiment illustrated, a supporting structure is shown in the form of a rectangular frame 1 composed of side bars or beams 2 of any suitable length and size connected at their opposite sides by cross beams 3 and 4. This structure is designed to rest on the supporting surface and has mounted thereon a hay fork or rake composed of side members 5 and 6 pivotally mounted at their rear ends on the shaft 7, supported in suitable bearings 8 carried by the rear cross beam 3 as is shown clearly in Fig. 1. At the front end of these side bars 5 and 6 is mounted the fork or rake proper comprising cross bars 9 and 10 having laterally spaced longitudinally extending teeth or lifting fingers 11 which are of the usual or ordinary construction.

A bar 12 is hingedly mounted at one end to the front cross beam 4 as shown at 13 and extends rearwardly to a point about midway the length of the supporting structure and is designed to operate as a weight for starting the lifting fork on its initial return movement. This bar 12 consequently is composed of material sufficiently heavy to overcome the weight of the fork after it passes its dead center on its upward movement so as to cause it to pass over said dead center on its return movement. A flexible element 14 is connected at one end to the head of the fork as shown at 15 and at its other end to said weight 12 at a point spaced inwardly from its free end as shown at 16. This flexible element 14 which may be a cord, cable or chain, passes around a drum 17 loosely mounted on the shaft 18 carried by suitable bearings 19 in uprights 20 which rise from the side beams 5 and 6 as is shown clearly in Figs. 2 and 3. This flexible element 14 is of a length sufficient to permit the lifting fork to be raised and to pass slightly beyond the perpendicular position to discharge its load.

A pair of bracing and fork supporting bars 21 and 22 are pivotally mounted on the side beams 2 at points spaced inwardly from the rear cross beam 3 and on their outer faces. These bars 21 and 22 diverge toward their free ends. These bars 21 and 22 are provided at their free ends with laterally and forwardly projecting upstanding guide fingers 23 between which the bars 5 and 6 of the rake frame are designed to pass and to be supported on rollers 24 mounted between said fingers. These fingers 23 flare outwardly so as to cause the reliable seating of the bars 5 and 6 therein.

A crank shaft 25 connects the front ends of the bars 21 and 22 as is shown clearly in Fig. 1. Lifting cables 26 are connected at one end to the crank shaft 25 and pass over drums 27 mounted loosely on the rod 18 at opposite sides of the drum 17. These cables are then connected at their opposite ends with drums 28 having pintles 29 at their opposite ends mounted on suitable bearings 30 on the side beams 2 of the supporting structure.

A larger drum 31 is fixed to move in unison with the drums 28 and has a cable 32 secured at one end thereof and adapted to be wound around said drum 31 so that when unwound it will rotate the drums 28 to wind up thereon the cables 26 for lifting the bars 21 and 22 when it is desired to raise the fork frame, it being obvious that the frame will rise with the bars since its side bars 5 and 6 rest between the flared fingers 23 of said bars, the lifting operation being shown in dotted lines in Fig. 3.

In the use of this hay stacker, the parts being in lowered postion as shown in Figs. 1 and 3, the fork is moved under the hay to receive its load and then the cable 32 is drawn out or unwound from the drum 31 thereby causing the cables 26 to be wound up on the drums 28 and lift the bars 21 and 22 carrying with them the bars 5 and 6 of the hay fork frame. This lifting operation is continued until the fork rises to perpendicular position and passes slightly beyond it to discharge its load, the further tilting being limited by cable 14. Immediately the cable 32 is released or slackened, the weight bar 12 will drop by gravity and being connected with the rear end of the fork will exert sufficient force to cause said fork to move forwardly over its dead center and then the weight of the fork and the force of gravity will operate to move it downward automatically until it again reaches the position shown in Figs. 1 and 3. This lowering of the fork will operate to unwind cables 26 and wind up cable 32 ready for the next lifting of the fork.

From the above description it will be obvious that this hay stacker while very simple in construction is strong and efficient in operation having few parts to get out of order or become broken and should they be broken they may be easily repaired by an ordinary laborer.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having fully described my invention, what I claim as new and desire to secure by Letters Patent, is:—

1. A hay stacker comprising a supporting structure, a fork having rearwardly extending arms pivoted at their free ends to said structure, bracing and supporting bars pivoted at one end to said structure at points in advance of the pivots of said fork arms, with their free ends in vertical alinement with said arms, said bars having diverging fingers to receive and guide the fork arms, a crank shaft connecting said bars, a bar hinged at one end to said structure and extending under said shaft, and a cable connected with said crank shaft for raising said bars to elevate said fork; another cable being connected with said hinged bar and with said fork and extending under said crank shaft, and a cable connected with said crank shaft for raising said bars to elevate said fork.

2. In a hay stacker, a supporting structure, a fork having arms pivotally mounted on said structure, bars pivoted at one end to said structure with their free ends positioned in vertical alinement with said arms to support and lift the same, a crank shaft connecting said bars at their free ends, a plurality of drums supported in a plane above the normal position of the arms, a cable connected at one end to said fork and passing under said crank shaft, a weight bar hinged at one end to said fork and to which the other end of said cable is connected, said cable passing over one of said drums, cables connected at one end to said crank shaft and passing over the other drums, another series of drums mounted on said structure to which the free ends of said last-mentioned cables are connected, and means for rotating said last-mentioned series of drums for actuating the crank shaft to lift the fork.

3. A hay stacker comprising a supporting frame, a fork having rearwardly extending arms pivoted at their rear ends to said frame, bracing and supporting bars pivoted at one end to said frame at points in advance of the pivots of said fork arms with their free ends arranged below and in alinement with said arms, said bars having spaced fingers to receive and guide the fork arms, a crank shaft connecting said bars at their free ends, a weight bar hinged at one end to the front of said frame and extending under said crank shaft, a cable connected at one end with said fork and at its other end with said weight bar and passing under said crank shaft, a drum located in rear of the connection of said cable and over which said cable passes, a plurality of fixedly connected drums mounted to rotate in the rear of said frame, cables connecting two of said drums with said crank shaft, and adapted to be wound on the drums, and another cable connected with the intermediate drum and wound in a direction opposite to the first mentioned cables whereby the winding of one cable will operate to unwind the other.

In testimony whereof I affix my signature in presence of two witnesses.

JULIAN L. DAHLEN.

Witnesses:
O. S. HELLERUD,
P. N. DRAYTEN.